L. G. YOUNG.
VERMIN TRAP.
APPLICATION FILED FEB. 9, 1920.
1,357,267.
Patented Nov. 2, 1920.
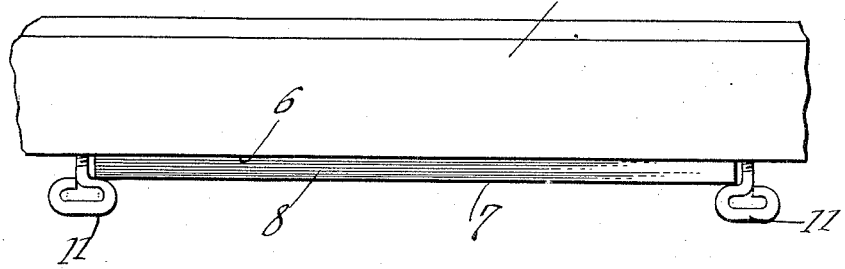
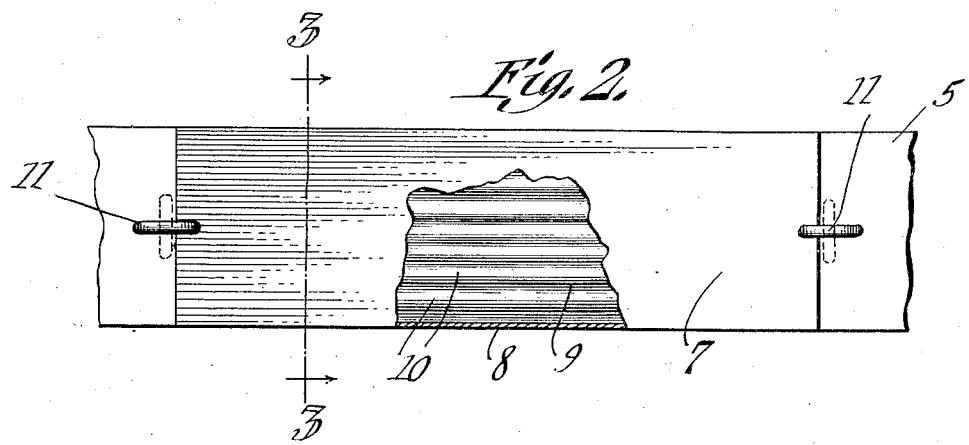
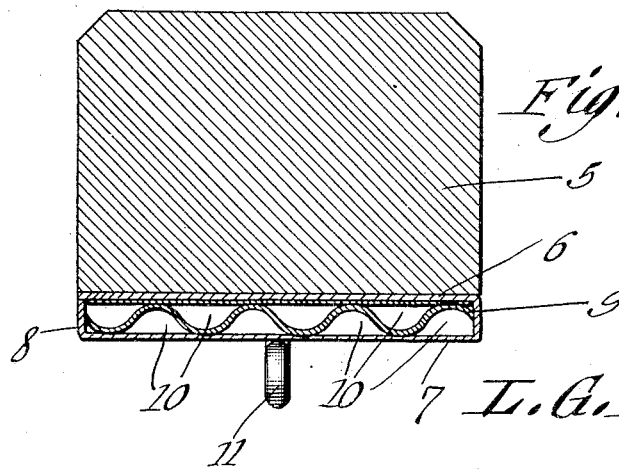
L. G. Young, Inventor

UNITED STATES PATENT OFFICE.

LELAND G. YOUNG, OF MUSCATINE, IOWA.

VERMIN-TRAP.

1,357,267.  Specification of Letters Patent.  Patented Nov. 2, 1920.

Application filed February 9, 1920. Serial No. 357,247.

*To all whom it may concern:*

Be it known that I, LELAND G. YOUNG, a citizen of the United States, residing at Muscatine, in the county of Muscatine and State of Iowa, have invented a new and useful Vermin-Trap, of which the following is a specification.

This invention relates to vermin traps, and more particularly to traps of this character adapted for attachment to roosts.

The primary object of the invention is to provide a trap which may be readily and easily disconnected from the roosts to permit the same to be easily cleaned.

A further object of the invention is to provide a device of this character which will in its normal position, lie directly under the lower side of the roost, so that no parts thereof will extend to the upper surface of the roost to be objectionable to the fowls using the roost.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a fragmental elevational view of a roost having a trap constructed in accordance with the present invention applied thereto.

Fig. 2 illustrates a bottom plan view of the same, a portion of the trap being shown as broken away, and Fig. 3 illustrates a sectional view taken on line 3—3 of Fig. 2.

Referring to the drawing in detail, the trap is shown as applied to the roost 5, and includes a relatively long strip of sheet metal bent to provide upper and lower surfaces 6 and 7 respectively, and side sections 8, the ends being left open to permit the vermin to enter the trap.

Positioned within the trap, and disposed between the walls 6, 7 and 8, is a removable partitioning member 9, the same being shown as including a corrugated surface, the corrugations being provided for the purpose of presenting longitudinal grooves 10.

In order that the trap may be readily and easily applied to the roost, the elongated eye bolts 11 are provided, which eye bolts have the threaded portions thereof embedded within the under surface of the roost to which the device is to be attached, the elongated heads of the bolts being positioned to lie transversely of the roost to permit the trap proper to be positioned between the eye bolts, which are arranged in spaced relation with each other.

After the trap has been properly located under the roost, the elongated heads of the bolts are moved to a position as indicated in Fig. 1 of the drawing, whereupon the trap is gripped between the heads of the eye bolts and the roost.

When the trap has been filled, the same is removed, and the inner partitioning member 9 is disconnected from the trap proper to the end that the vermin may be disposed of in any suitable manner.

Having thus described the invention, what I claim as new is:—

1. A vermin trap including top and bottom walls, side walls connecting the top and bottom walls, a removable partitioning member disposed between the walls, and means for securing the trap to a roost.

2. A vermin trap including top and bottom walls, side walls connecting the top and bottom walls, a removable corrugated partitioning member positioned between the walls, and means for securing the trap to a roost.

3. A vermin trap comprising a body portion having open ends, a removable partitioning member, said partitioning member being constructed to provide longitudinal grooves, and means for securing the trap to a roost.

4. In a vermin trap, a body portion including a continuous strip of sheet metal folded to provide top and bottom walls, and side walls, a removable corrugated partitioning member disposed within the body portion, and means for securing the trap to a roost.

In testimony that I claim the foregoing as my own, I have hereto affixed my signature in the presence of two witnesses.

LELAND G. YOUNG.

Witnesses:
 JAS. D. HAWKINS,
 OLIVER BARNARD.